(No Model.) 2 Sheets—Sheet 1.

J. C. WELLS.
SADDLE.

No. 544,333. Patented Aug. 13, 1895.

Witnesses
Arthur B. Jenkins.
Julia Stern.

Inventor
John C. Wells
by Chas. L. Burdett,
attorney.

(No Model.) 2 Sheets—Sheet 2.
J. C. WELLS.
SADDLE.
No. 544,333. Patented Aug. 13, 1895.
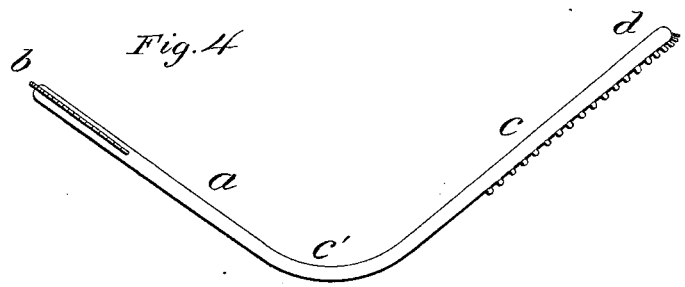
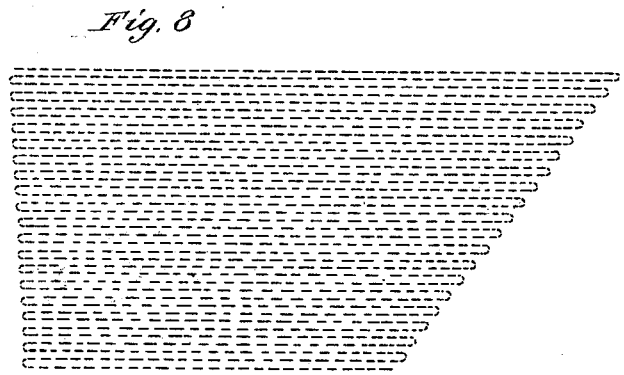
Witnesses:
Arthur B. Jenkins.
Julia Stone.
Inventor:
John C. Wells,
by Chas. L. Burdett
Attorney

UNITED STATES PATENT OFFICE.

JOHN C. WELLS, OF EAST HAMPTON, CONNECTICUT, ASSIGNOR TO THE CLIMAX MANUFACTURING COMPANY, OF SAME PLACE.

SADDLE.

SPECIFICATION forming part of Letters Patent No. 544,333, dated August 13, 1895.

Application filed April 8, 1895. Serial No. 544,853. (No model.)

*To all whom it may concern:*

Be it known that I, JOHN C. WELLS, a citizen of the United States, and a resident of East Hampton, in the county of Middlesex and State of Connecticut, have invented certain new and useful Improvements in Saddles, of which the following is a full, clear, and exact description, whereby any one skilled in the art can make and use the same.

My invention relates more particularly to the class of saddles that are adapted for use on velocipedes and like vehicles of that general kind, and the object of my invention is to provide a saddle with a flexible seat that shall be strong, light, durable, elastic as well as flexible, and possessing capabilities of adjustment to the surface of the body in contact with the seat which shall tend to prevent chafing and shall be cool and comfortable to the user.

To this end my invention consists in a frame having in combination a seat made of spring-wire peculiarly constructed and attached to the frame, and it further consists in the details of the several parts making up the saddle as a whole and in the combination of such parts, as more particularly hereinafter described, and pointed out in the claims.

Figure 1:
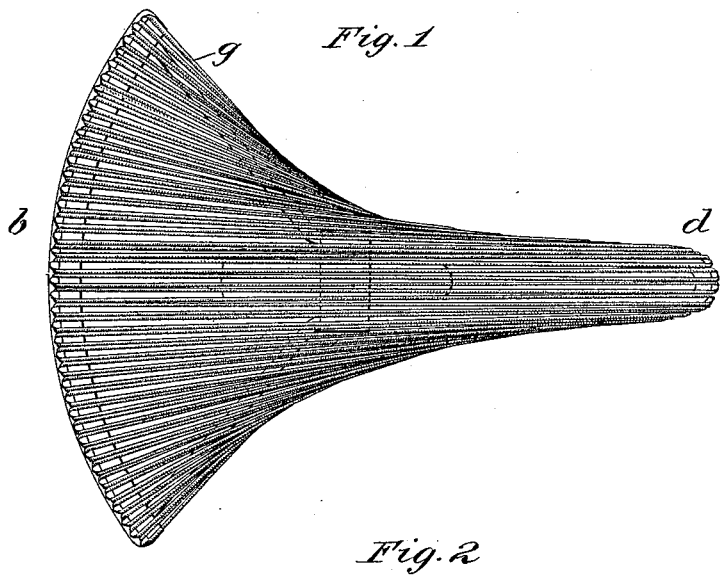
Figure 2:
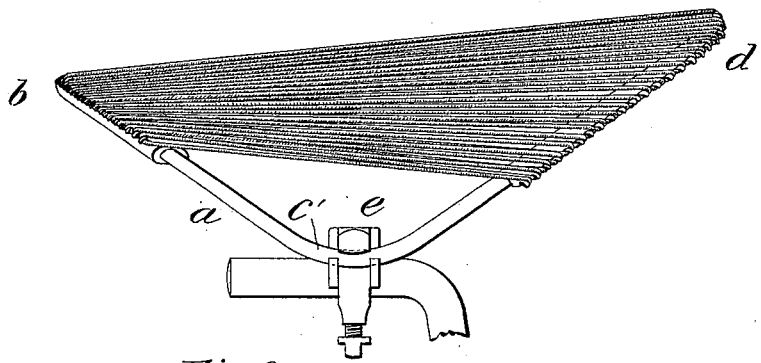
Figure 3:
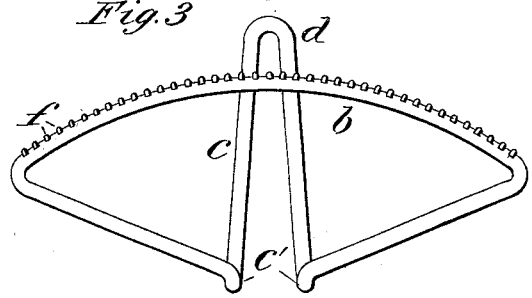

Referring to the drawings, Figure 1 is a top view of a saddle embodying my invention. Fig. 2 is a view in side elevation of the saddle. Fig. 3 is a detail rear view of the saddle-frame. Fig. 4 is a detail side view of the saddle-frame. Fig. 5 is a detail view, on enlarged scale, in cross-section through the cantle or back part of the frame. Fig. 6 is a detail view, on enlarged scale, of a part of the coil making up the seat. Fig. 7 is a detail view showing the coil extended by a lengthwise strain. Fig. 8 is a detail diagram view illustrating one half of the elastic seat.

In the construction of a bicycle the saddle forms an important part, but being removably secured to the frame of the bicycle forms a distinct article of merchandise, and as such many different forms have been made and put upon the market, the greater number comprising a frame, usually of metal, and a covering or seat stretched between parts of the frame and usually made of leather. In the earnest attempt that is being made by manufacturers and riders to reduce the weight of the bicycle as a whole to the minimum the saving of weight in a saddle is an important feature. In prior saddles having the seat of leather or like material a constant objection has been the tendency of the leather to stretch, to become distorted, and to assume a shape which cuts and chafes the user, and a further objection is found in the warmth of the leather-surface, which has been practically continuous, except for a lengthwise opening along the center. It is also known in the prior art that a bicycle-saddle can be made with a frame having stretched across it a seat made of individual coils of spring-wire and of other elastic material, but such a construction of saddle has failed of success and has not come into use for the reason that the large size of the coils required to give the needed strength to support the rider has added to the weight and also served as a distinct irritating feature.

In the practice of my improvement the coil is made of very small diameter, two or more strands being nested together in the coil. A continuous length of coil is preferably used, so attached to the pommel and cantle as to arrange the coils preferably in pairs side by side and almost in contact, with a sufficient space between the pairs of coils to afford the desired ventilation, and these coils are attached to the frame by a method which enables a comparatively light frame to be used and the coils to be held under a sufficient tension to maintain the normal shape of the seat and to afford to the coil the desired resiliency, which will enable the surface to change to meet the pressure of that part of the body applied to and in movement on the seat and at the same time to enable the spring to restore the original or normal shape of surface of the seat when the pressure is removed.

In the accompanying drawings, the letter *a* denotes the frame of the seat, and it is preferably made of a length of wire or small bar of metal, as steel bent to shape, and with the ends united either by welding, brazing, soldering, or in any other desirable manner. This frame is broad at the rear part, forming the cantle *b*, has a narrow portion *c* terminating in the pommel $d$. In the horizontal plane the frame is dished or bent downward into something of a V shape, the lowermost portion $c'$ being near enough together to enable the frame to be secured, as by means of a clamp $e$, to the seat-post of a bicycle or to a rigid part of the frame of any vehicle to which the seat may be attached. Along the cantle $b$ anchor-points $f$ are secured, and these points are preferably arranged at even intervals apart and are made of metal sufficiently flexible to enable them to be bent downward to firmly hold the coil of wire passed around each anchor-point. The front portion or pommel of the frame is also provided with these projecting anchor-points, firmly secured to the frame and so arranged as to form points of support for the front ends of the coils of the fabric of which the seat is composed.

The fabric of which the seat is composed is a coil of wire, preferably continuous, and each individual length of the coil $g$ is composed of a number of individual strands $g'$ $g^2$ nested together. A spiral, formed of wire wound to shape, has a resiliency after lengthwise extension of the coil dependent upon the material of which the wire is made and the diameter of the coil. It is possible by a tensile strain upon the coil to extend the convolutions such a distance from each other as to cause the metal to set and to take all of the resiliency out of the coil. For the purpose of a seat for a saddle it is desirable to make the coil of very small diameter, using for this purpose a wire of comparatively small gage, and it has been found by experiment that a coil having a diameter of one-twentieth of an inch, made of No. 29 gage wire and of German silver, will stand a tensile strain of about nine pounds before becoming set. If two strands of wire are coiled up together side by side they nest with each other, as shown in the enlarged detail view in Fig. 6 of the drawings; but it is evident that if the ends of the respective coils are held and a tensile strain be exerted the resistance to the extension will be twice nine pounds or eighteen for the single strand. By so nesting the coils the added strength of a coil of comparatively small diameter is gained and at the same time a degree of tensile strain permitted which would distort and set a coil made of a single strand. More than two strands may be coiled up together, if desired, and the same principle followed out secures a greater tensile strength of the coil without departing from the invention. In order to briefly describe this construction I have termed each length a "compound coil," meaning by that that it is composed of more than a single strand, and in the practice of my invention a continuous compound coil is produced of a sufficient total length to extend back and forth across the top of the frame and to form the seat, the length of coil being looped around the several anchor-points or pommel and cantle in alternation, forming a surface which is of an outline, as shown in the drawings, the side parts extending down about the pommel and forming the skirt of the saddle.

In order to enable the seat to be properly secured to the frame a blank is formed by bending a continuous length of the coiled wire around fixed points which correspond in number to the anchor-points on a seat-frame, very little, if any, tension being applied to the coil in making the seat-blank—that is, only enough pull being used to properly straighten each length between the fixed points. One half of a seat-blank is illustrated in Fig. 8 of the drawings, the division being made along the center line of the blank.

In fitting the seat-blank onto the frame the coil at each bend is passed over the anchor-points and successive lengths are attached at the bend by hooking the coil over the anchor-points, either working from the center outward or from the sides of the frame toward the center line. Each length of the blank is slightly shorter than the distance between the anchor-points on the pommel and cantle to which the opposite ends of the length are attached, so that each length is slightly stretched in fastening the seat-blank to the frame, but if the blank is attached to the frame by working altogether from one side the strain is sufficient to distort and bend an extremely-strong frame of steel wire, but by attaching the material to the frame in the manner described the strains are balanced and a frame can be used of proper diameter to secure a sufficient rigidity of frame to support the strain and at the same time make the saddle as a whole extremely light. Where the strand bends around the anchor-point, the latter is bent downward, as shown in Fig. 5, and secures the strand firmly in place. In order to aid in the wear a packing $i$ of leather is placed along the cantle and pommel and a finish $k$, also of leather, placed over that, each anchor-point extending through a hole in the cushion of leather or like soft material. The interposition of this leather cushion is of considerable advantage as forming of itself a soft seating-surface and at the same time permitting the free action of the elements of each coil up to the anchor-point.

By constructing the seat or covering layer of the saddle of the continuous coil of wire, as described, I am enabled to use wire of small gage, coils of small diameter, and therefore to place the coils side by side in pairs, so that they afford mutual support, and the advantage is obtained in almost every instance, even where an object of quite small surface area is pressed upon the saddle of the resistance to the pressure by two coils at least, these two coils having a tensile strength of four single wires in case the compound coil is made up of two wires and of the sum of the individual strands where a larger number of separate coils than two is used.

By the practice of my invention I produce a seat which is at all times flexible, so that it yields readily in all directions, is elastic, has the coils formed so close together that there is no chance to pinch any article of wearing apparel between them, is resilient, so that all parts of the surface are restored to their original position as soon as the pressure is removed, is cool, strong, and durable, and, as has been ascertained by actual experiment in which the saddles have been used in many thousand miles of riding, is a form of surface which will absolutely prevent chafing by heating the surface of the body in contact with the seat.

I claim as my invention—

1. The method of constructing a saddle which consists in forming a rigid frame to shape with raised pommel and cantle portions, providing the pommel and cantle with flexible anchoring points for the seat fabric, then forming a seat blank of a continuous length of coiled wire with the corresponding coils on the opposite sides of the center line of substantially equal length, then securing this blank to the saddle frame, two or more lengths being united simultaneously on opposite sides of the frame, and working toward or from the center line of said frame, all substantially as described.

2. In combination in a saddle, a frame with raised cantle and pommel, flexible anchor points secured to the cantle and the pommel, a seat composed of a compound elastic and flexible coil, of strands of wire nested together, in lengths stretched back and forth from cantle to pommel with each length secured to the anchor points which are bent down to secure the seat to the frame and a cushion underlying the end of each length of the coil at the anchor points, all substantially as described.

3. In combination in a saddle for a bicycle, a rigid frame consisting of a continuous rod bent inward and downward at the center of the frame, the side parts of the frame at the center being substantially parallel and extending forward and upward to form the narrow pommel portion, and upward and outward to form the broad cantle portion, flexible anchor points on the cantle and pommel, and a flexible and elastic seat consisting of a small compound elastic and flexible coil of wire of several strands which are nested together the said coils extending in separate lengths back and forth from pommel to cantle and secured to the frame by the downturned anchor points, all substantially as described.

JOHN C. WELLS.

Witnesses:
CHAS. L. BURDETT,
ARTHUR B. JENKINS.